United States Patent
Furuya (10) Patent No.: US 10,657,673 B2
(45) Date of Patent: May 19, 2020

(54) IMAGE PROCESSING APPARATUS, IMAGE PROCESSING METHOD, AND STORAGE MEDIUM TO CORRECT PIXELS USING SINGULAR VALUE DECOMPOSITION

(71) Applicant: CANON KABUSHIKI KAISHA, Tokyo (JP)

(72) Inventor: Kohei Furuya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 82 days.

(21) Appl. No.: 15/898,056

(22) Filed: Feb. 15, 2018

(65) Prior Publication Data
US 2018/0240254 A1    Aug. 23, 2018

(30) Foreign Application Priority Data
Feb. 21, 2017 (JP) .................. 2017-030246

(51) Int. Cl.
*G06T 7/90* (2017.01)
*G06T 5/00* (2006.01)

(52) U.S. Cl.
CPC ............ *G06T 7/90* (2017.01); *G06T 5/002* (2013.01); *G06T 5/006* (2013.01); *G06T 2207/10024* (2013.01); *G06T 2207/20024* (2013.01)

(58) Field of Classification Search
CPC .. G06T 7/90; G06T 5/002; G06T 5/006; G06T 2207/10024; G06T 2207/20024
See application file for complete search history.

(56) References Cited

U.S. PATENT DOCUMENTS

| 7,693,351 | B2* | 4/2010 | Sasaki | G06T 3/4015 382/276 |
| 8,089,534 | B2* | 1/2012 | Rao | G06T 5/009 348/241 |
| 2006/0227227 | A1* | 10/2006 | Tsuruoka | H04N 5/361 348/241 |
| 2007/0153335 | A1* | 7/2007 | Hosaka | H04N 1/58 358/463 |

(Continued)

FOREIGN PATENT DOCUMENTS

JP    2014-53830 A    3/2014

OTHER PUBLICATIONS

Shunsuke Ono, et al.; "A Convex Regularizer for Reducing Color Artifact in Color Image Recovery;" Conference on Computer Vision and Pattern Recognition (CVPR), pp. 1775-1781.

*Primary Examiner* — Kim Y Vu
*Assistant Examiner* — Molly Delaney
(74) *Attorney, Agent, or Firm* — Canon U.S.A., Inc. IP Division (57) ABSTRACT

An image processing apparatus allows strength of color moire reduction processing to be changed according to a parameter at the time of development in the processing for reducing color moire. A processor of this image processing apparatus performs development processing on an image, acquires a singular value with respect to a pixel value contained in a partial region in the image on which the development processing has been performed, corrects the singular value according to a value of a parameter in the development processing, and calculates a corrected pixel value in the partial region with use of the corrected singular value.

12 Claims, 9 Drawing Sheets

(56) References Cited

U.S. PATENT DOCUMENTS

| | | | | |
|---|---|---|---|---|
| 2012/0201454 A1* | 8/2012 | Sato | .............. | H04N 9/646 |
| | | | | 382/167 |
| 2015/0249795 A1* | 9/2015 | Cho | .............. | H04N 5/3572 |
| | | | | 348/229.1 |
| 2017/0374282 A1* | 12/2017 | Naruse | .............. | G03B 15/00 |

* cited by examiner

IMAGE PROCESSING APPARATUS, IMAGE PROCESSING METHOD, AND STORAGE MEDIUM TO CORRECT PIXELS USING SINGULAR VALUE DECOMPOSITION

BACKGROUND OF THE INVENTION

Field of the Invention

One disclosed aspect of the embodiments relates to an image processing apparatus, an image processing method, and a storage medium.

Description of the Related Art

Imaging apparatuses such as digital cameras employ a filter including, for example, a filter for cutting off infrared light and/or ultraviolet light that would affect an imaging result and/or a low-pass filter for reducing moire by blocking a high spatial frequency before an image sensor (an image sensing device) is exposed to incident light. In recent years, there has also been provided an imaging apparatus aiming at improvement of a perceived resolution by removing the low-pass filter from this filter. However, in this case, color moire may undesirably occur when an object having a high spatial frequency is input.

To address this issue of the occurrence of the color moire, "A CONVEX REGULARIZER FOR REDUCING COLOR ARTIFACT IN COLOR IMAGE RECOVERY" presented by Shunsuke Ono and Isao Yamada in Conference on Computer Vision and Pattern Recognition (CVPR), pages 1775-1781 in 2013 discusses a method that, with respect to a small region in an image, extracts a plurality of singular values indicating a feature of this region and reduces an influence of a singular value having a relatively low contribution rate among these singular values. A singular value having a highest contribution rate indicates a principal feature of this small region while the singular value having the low contribution rate indicates a fluctuation from this principal feature, and linearity in the small region can be improved by correcting this singular value having the low contribution rate. The color moire itself is a cause for impairing the linearity of the image, and therefore this method can reduce the color moire that has undesirably occurred in the image.

However, while details of the image are also unintentionally lost if the color moire is strongly reduced with use of the proposed technique, the color moire may undesirably remain if the color moire reduction is weakly applied to maintain the details of the image. Therefore, Japanese Patent Application Laid-Open No. 2014-53830 discusses a technique that determines whether the color moire would easily occur based on a shape of an object, and increases the strength of the color moire reduction if the color moire would easily occur.

A likelihood of the occurrence of the color moire has largely depended on the shape of the object, but a parameter setting in development processing has also affected how much the color moire has actually affected an imaged appearance.

SUMMARY OF THE INVENTION

One disclosed aspect of the embodiments is directed to providing a technique that allows the strength of the color moire reduction processing to be changed according to the parameter at the time of the development in the processing for reducing the color moire.

According to an aspect of the embodiments, an image processing apparatus includes circuitry configured to perform development processing on an image, acquire a singular value by carrying out singular value decomposition with respect to a pixel value contained in a partial region in the image on which the development processing has been performed, correct the singular value according to a value of a parameter in the development processing, and calculate a corrected pixel value in the partial region with use of the corrected singular value.

Further features of the disclosure will become apparent from the following description of exemplary embodiments with reference to the attached drawings.

DESCRIPTION OF THE EMBODIMENTS

In the following description, exemplary embodiments will be described in detail with reference to the accompanying drawings. Each of the exemplary embodiments will be described as an example of an exemplary embodiment in which strength of color moire reduction processing is changed according to a development parameter.

Figure 1A:
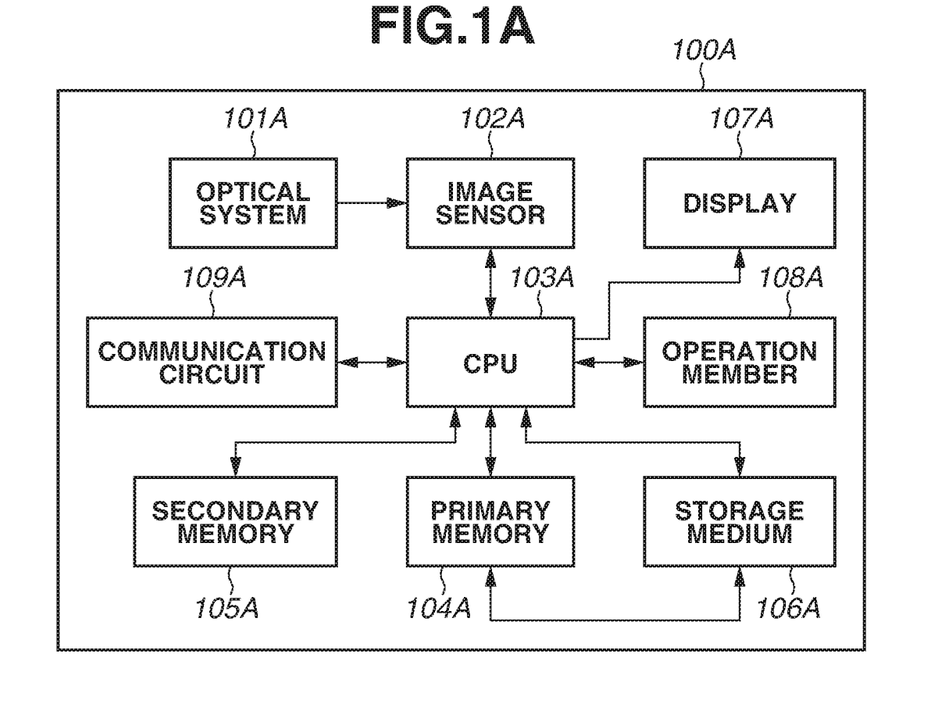
FIG. 1A is a block diagram illustrating an example of a configuration of an image processing apparatus according to a first exemplary embodiment.

In the following description, a first exemplary embodiment will be described with reference to the accompanying drawings. FIG. 1A is a block diagram illustrating a configuration of an imaging apparatus 100A, which is one example for realizing an image processing apparatus according to the first exemplary embodiment. The imaging apparatus 100A can be realized as, for example, a digital camera or a digital video camera. Besides them, the imaging apparatus 100A can also be realized as an arbitrary information processing terminal or imaging apparatus, such as a personal computer, a mobile phone, a smartphone, a personal digital assistance (PDA), a tablet terminal, and a mobile media player.

In FIG. 1A, an optical system 101A includes a lens group, a shutter, and a diaphragm, and an operation thereof is controlled by a central processing unit (CPU) 103A, which is a processor or a programmable device. Light from an object focuses on an image sensor 102A after passing through the optical system 101A. The image sensor 102A converts the light having focused after passing through the optical system 101A into an image signal. The CPU 103A carries out various kinds of calculations and controls each of portions forming the imaging apparatus 100A according to an input signal and a program.

A primary memory 104A stores temporary data therein, and is used for work of the CPU 103A. The temporary memory 104A is configured as, for example, a random access memory (RAM). A secondary memory 105A stores therein a program (firmware) for controlling the imaging apparatus 100A and various kinds of setting information. The program may include instructions that, when executed by the processor, cause the processor to perform operations described in the following. The secondary memory 105A is configured as, for example, a read only memory (ROM) or a hard disk. A storage medium 106A stores therein, for example, image data imaged by the optical system 101A, converted into an electric signal by the image sensor 102A, and processed by the CPU 103A. The storage medium 106A can be detached from the imaging apparatus 100A after imaging, and can be attached to an external personal computer or the like to then allow the recorded data to be read out therefrom. In other words, the imaging apparatus 100A and the storage medium 106A may be related to each other in any manner as long as the imaging apparatus 100A has a function of accessing the storage medium 106A and can read and write data from and into the storage medium 106A. A display 107A is formed of a liquid crystal display or the like, and, for example, displays a viewfinder image at the time of the imaging, displays the captured image, and displays a character for an interactive operation. An operation member 108A is provided to receive an operation of a user. For example, a button, a lever, a touch panel, and/or the like can be used as the operation member 108A.

A communication circuit 109A connects to an external apparatus and transmits/receives a control command and data. For example, Picture Transfer Protocol (PTP) is used as a protocol for establishing the connection and carrying out the data communication. The communication circuit 109A may carry out the communication via a wired connection such as a Universal Serial Bus (USB) cable. Alternatively, the communication circuit 109A may carry out the communication via a wireless connection such as a wireless local area network (LAN). Further, the communication circuit 109A may directly connect to the external apparatus or may connect to the external apparatus with the aid of mediation by a server via a network such as the Internet.

FIG. 1A illustrates the configuration including the optical system 101A and the image sensor 102A in consideration of the example in which the image processing apparatus functions as the digital camera or the like. However, the exemplary embodiment of the disclosure may be realized by a configuration that does not include the optical system 101A or the imaging unit 102A as an information processing apparatus, an image processing apparatus, an image recording apparatus, or the like capable of forming and recording an image. Therefore, FIG. 1B illustrates an example of a configuration in a case where the image processing apparatus according to the present exemplary embodiment is configured as an information processing apparatus 100B.

Figure 1B:
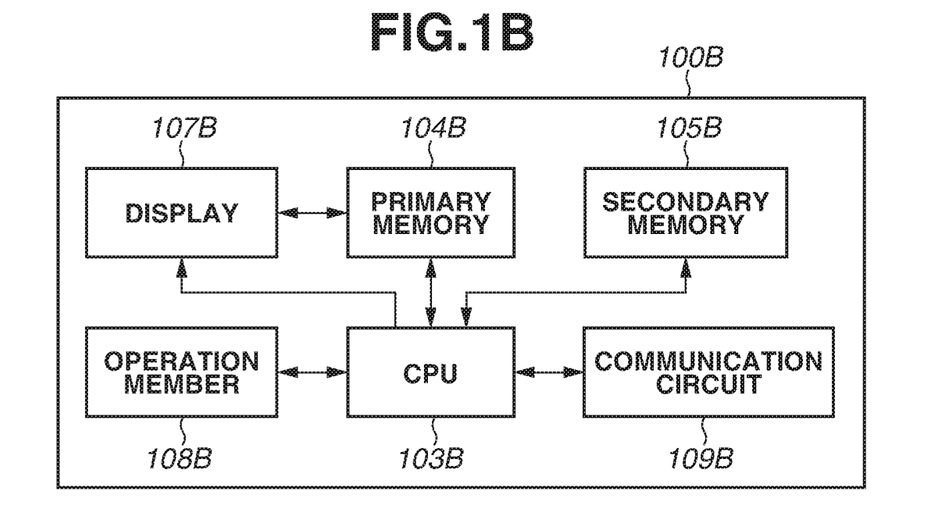
FIG. 1B is a block diagram illustrating an example of a configuration of an information processing apparatus according to the exemplary embodiment.

In FIG. 1B, a display 107B, for example, displays a captured image and displays a character for an interactive operation. An operation member 108B is provided to receive an operation of a user. For example, a keyboard and/or a pointing device can be used as the operation member 108B. A CPU 103B carries out various kinds of calculations and controls each of portions forming the information processing apparatus 100B according to an input signal and a program. A primary memory 104B stores temporary data therein, and is used for work of the CPU 103B. The temporary memory 104B is configured as, for example, a RAM. A secondary memory 105B stores a program for performing image processing and various kinds of setting information therein. The secondary memory 105B is configured as, for example, a ROM or a hard disk. A communication circuit 109B connects to an external apparatus and transmits/receives a control command and data. A configuration similar to the communication circuit 109A can also be selected as the configuration of the communication circuit 109B.

In the above-described manner, the image processing apparatus according to the present exemplary embodiment can be configured as the imaging apparatus 100A and the information processing apparatus 100B. Then, hereinafter, they will be collectively referred to as an image processing apparatus 100, and the individual components thereof will also be indicated by reference numerals with the alphabet A or B omitted therefrom, such as a CPU 103, for simplicity of the description.

Figure 2:
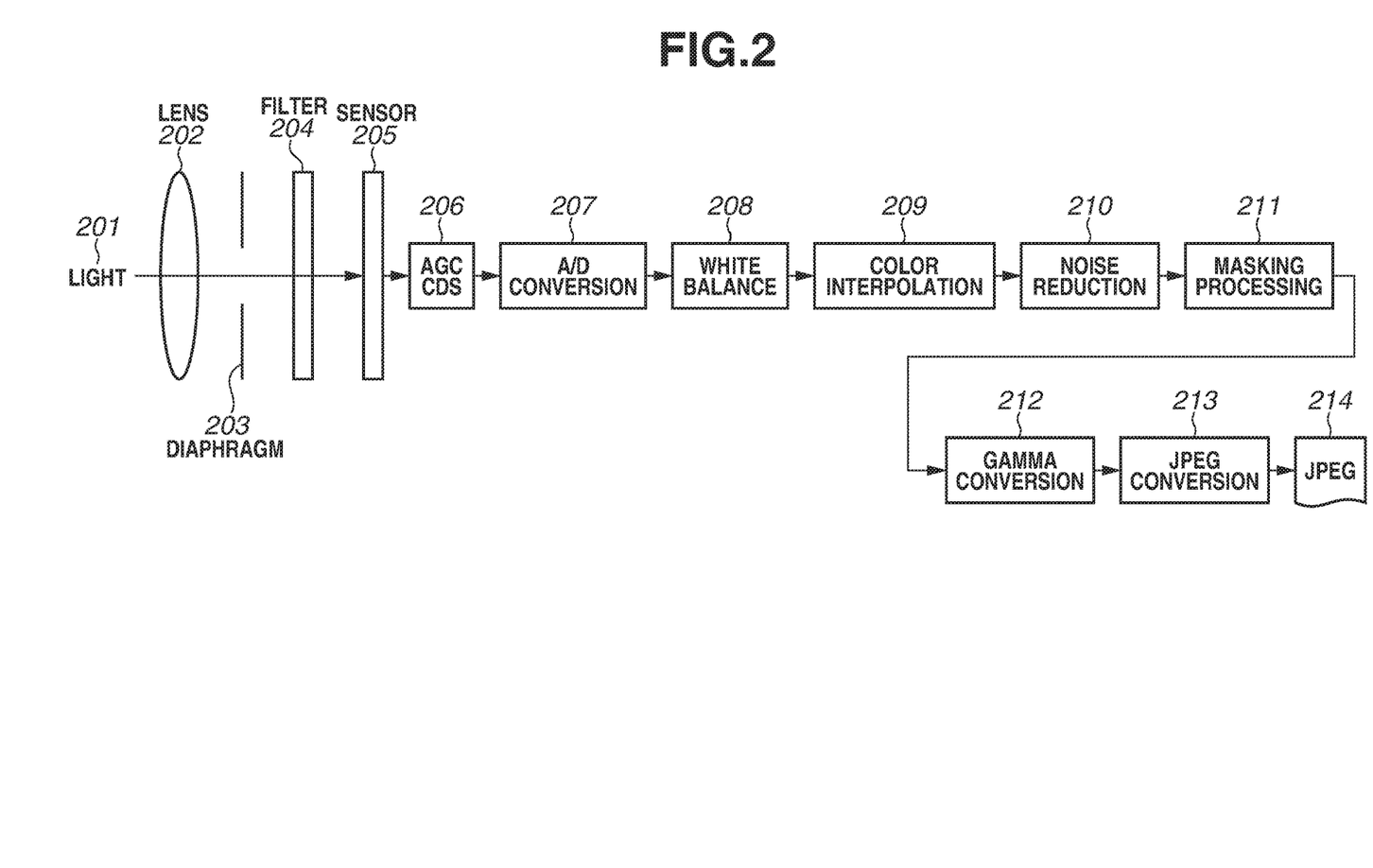
FIG. 2 is a block diagram illustrating an example of a configuration of an imaging apparatus according to the first exemplary embodiment.

Next, an example of a configuration of the image processing apparatus 100 and a process in which the image processing apparatus 100 forms an image will be described with reference to FIG. 2. FIG. 2 illustrates a specific configuration example in the case where the image processing apparatus 100 is configured as the imaging apparatus 100A.

This configuration causes light 201 incident on a camera to pass through a lens 202, be subjected to an adjustment of a light amount thereof by the diaphragm 203, and allow a sensor 205 to be exposed thereto only during a time period in which a shutter (not illustrated) is opened. Further, before the sensor 205 is exposed to the light 201, the light 201 passes through a filter 204 including, for example, a filter for cutting off infrared light and/or ultraviolet light that would affect an imaging result and/or a low-pass filter for reducing moire by blocking a high spatial frequency. The light 201 to which the sensor 205 is exposed is accumulated as a charge amount, subjected to noise removal and gain amplification by a correlated double sampling (CDS)/automatic gain control (AGC) circuit 206, and converted into digital data by an analog-to-digital (A/D) convertor 207.

Figure 3A:
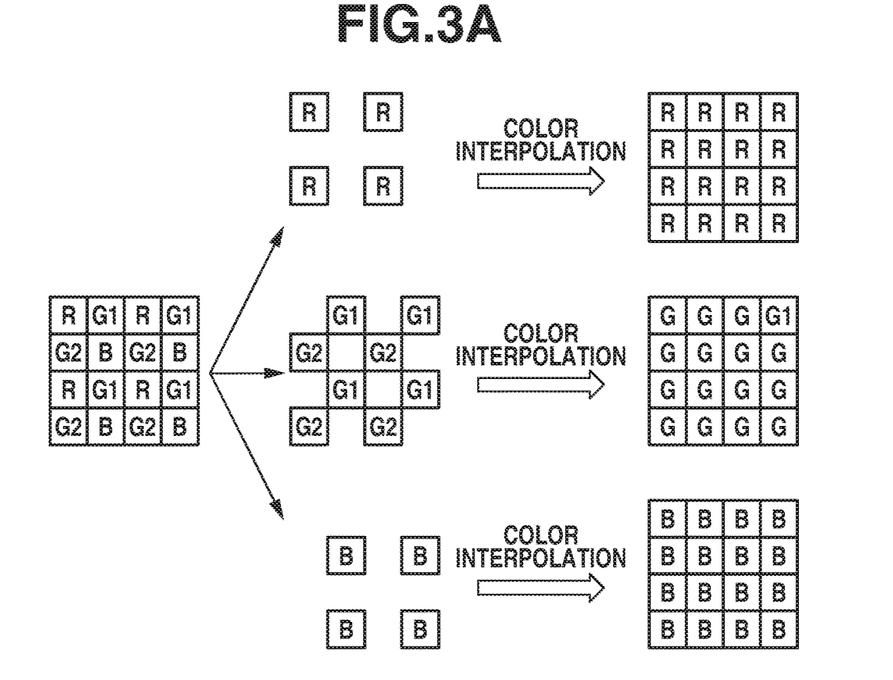
FIG. 3A illustrates an example of image data of Red Green Blue (RGB) three planes generated by color interpolation processing in the imaging apparatus.

Development processing is performed on the image converted into the digital data. This image is subjected to a gain adjustment regarding each of Red, Green, and Blue (RGB) color components by a white balance circuit 208, and, for example, RGB three color planes are generated by a color interpolation circuit 209 as illustrated in FIG. 3A. Then, the image data expressed as the RGB three planes is subjected to a reduction of noise generated in the image by a noise reduction circuit 210. The image data with the noise reduced therein is next subjected to an adjustment regarding hues of the RGB colors by a masking processing circuit 211, and processing required to display the image on a display or the like by a gamma conversion circuit 212. A Joint Photographic Experts Group (JPEG) conversion circuit 213 carries out, for example, compression into JPEG based on the image data generated in this manner, by which a final image 214 is generated. Each of the circuits described with reference to this FIG. 2 is provided inside the CPU 103. Alternatively, the image processing apparatus 100 may be configured in such a manner that the CPU 103 exerts one or more of the functions of these circuits by software processing.

Next, the moire that occurs in the image data generated by the configuration illustrated in FIG. 2 will be described. If the low-pass filter is removed from the filter 204 to improve a resolution in the configuration illustrated in FIG. 2, the color moire may undesirably occur when an object having a high spatial frequency is input.

Figure 3B:
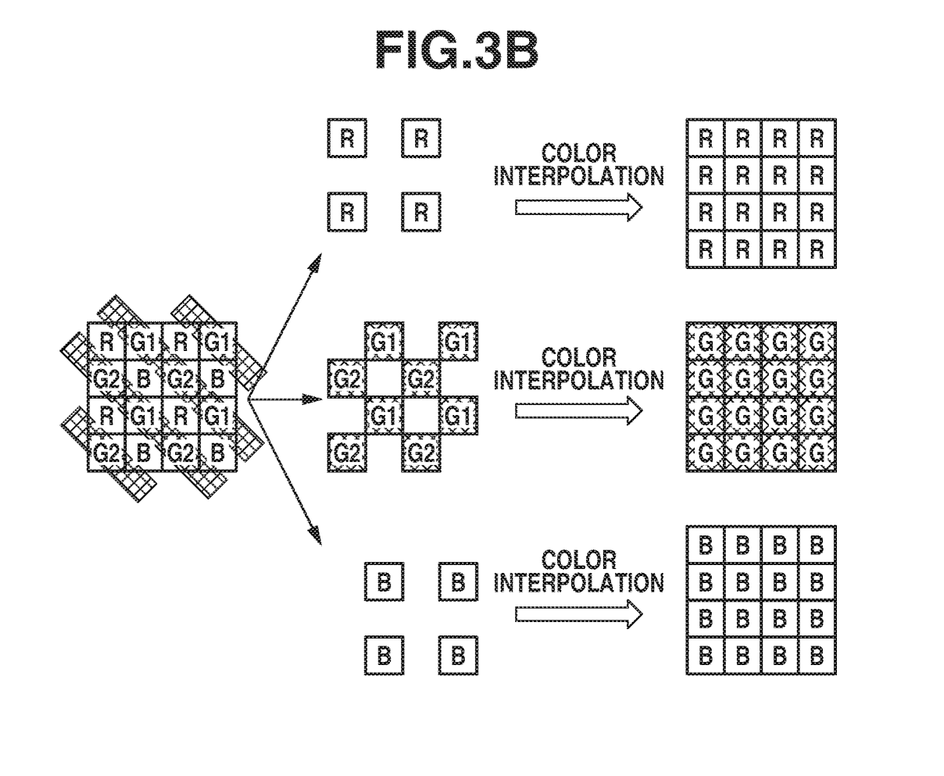
FIG. 3B illustrates one example of a cause for occurrence of color moire.
Figure 3C:
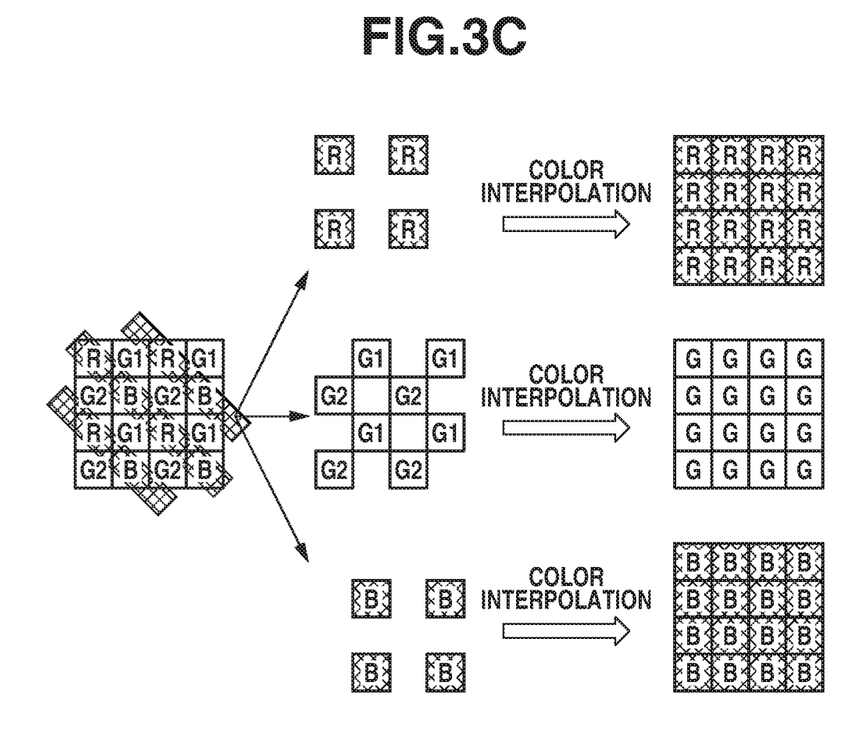
FIG. 3C illustrates another example of the cause for the occurrence of the color moire.

FIGS. 3B and 3C each illustrate an example of a cause for the occurrence of the color moire. FIGS. 3B and 3C indicate the RGB three color planes with white and black lines obliquely inserted from the exposure as illustrated therein. When the color interpolation circuit 209 performs color interpolation processing on such an object, for example, in FIG. 3B, the lines that are actually black and white lines are falsely changed into magenta lines because G is incorrectly recognized as having a low value over the entire plane while R and B each have a high value over the entire plane. Further, in FIG. 3C, the lines that are actually white and black lines are falsely changed into green lines because G is incorrectly recognized as having a high value over the entire plane while R and B each have a low value over the entire plane. The color moire may undesirably occur in this manner.

Further, strength of such color moire is affected by a development parameter set in development processing including the white balance processing by the white balance circuit 208 up to the masking processing by the masking processing circuit 211 and the like. For example, if gains to be applied to R and B are increased in the white balance processing by the white balance circuit 208, the color moire is also unintentionally emphasized, so that the color moire also appears further noticeably along therewith. Further, if such processing that color saturation is enhanced is performed in the masking processing by the masking processing circuit 211, the color moire is also emphasized in a similar manner, so that the moire appears further noticeably. Therefore, carelessly performing the color moire reduction processing at a similar level without taking such a development parameter into consideration may undesirably result in insufficiency of the correction.

There are various methods for acquiring such a development parameter (for example, including setting parameters for the white balance gain, the color saturation enhancement, and the noise reduction). For example, in the case of a configuration like the image processing apparatus 100, the acquisition of the development parameter can be realized by acquiring the various kinds of setting information stored in the secondary memory 105 as described above. Alternatively, the acquisition of the development parameter can also be realized by causing the CPU 103 to write the development parameter as header information in advance when recording the image into the storage medium 106, and causing the CPU 103 to refer to this header information when reading in the recorded image from the storage medium 106.

Further, even in a case where a file having unknown header information is input, the acquisition of the development parameter can also be realized by referring to, for example, Exchangeable image file format (Exif) information defined by the Japan Electronics and Information Technology Industries Association (JEITA) standards. For example, one possible method for acquiring the color saturation information is to use information about imaging color saturation written in the Exif information. Further, the strength of the noise reduction can be estimated from a relationship between International Organization for Standardization (ISO) sensitivity information acquired from the Exif information and a noise amount in the image.

Figure 8:
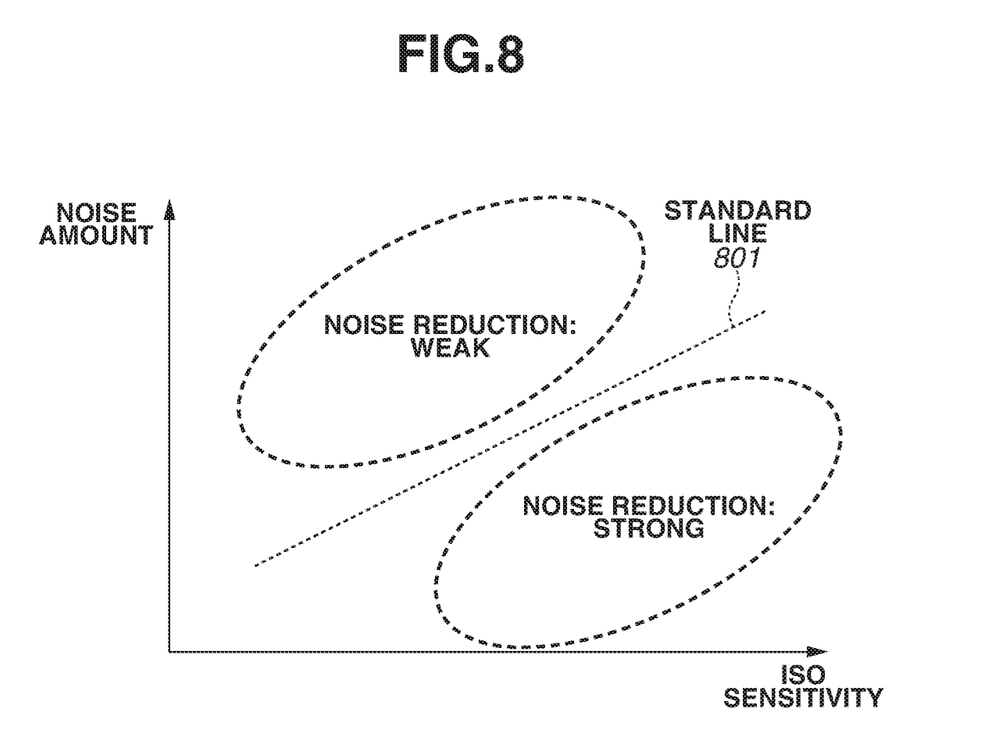
FIG. 8 is a graph indicating a relationship between an International Organization for Standardization (ISO) sensitivity and a noise amount.

In this case, for example, the strength of the noise reduction can be estimated by defining a standard line 801 indicating a standard relationship with respect to the relationship between the ISO sensitivity and the noise amount as illustrated in FIG. 8, and confirming how far the actual relationship between the ISO sensitivity and the noise amount deviates from this line 801. Further, regarding the white balance gain, the reference to the Exif information also allows the white balance gain to be estimated from light source information or information about flash emission written in the Exif information. The parameter at the time of the imaging can be acquired or estimated in this manner.

In the following description, image processing according to the present exemplary embodiment for reducing the color moire will be specifically described. An example in which the strength of the color moire reduction processing is changed according to the development parameter will be described with reference to a flowchart illustrated in FIG. 4 to indicate a specific image processing example according to the present exemplary embodiment. The CPU 103 executes a corresponding program stored in the secondary memory 105, by which the flowchart illustrated in FIG. 4 can be realized. Further, in the flowchart illustrated in FIG. 4 and a flowchart illustrated in FIG. 5, which will be described below, steps are indicated by an alphabet S.

Figure 4:
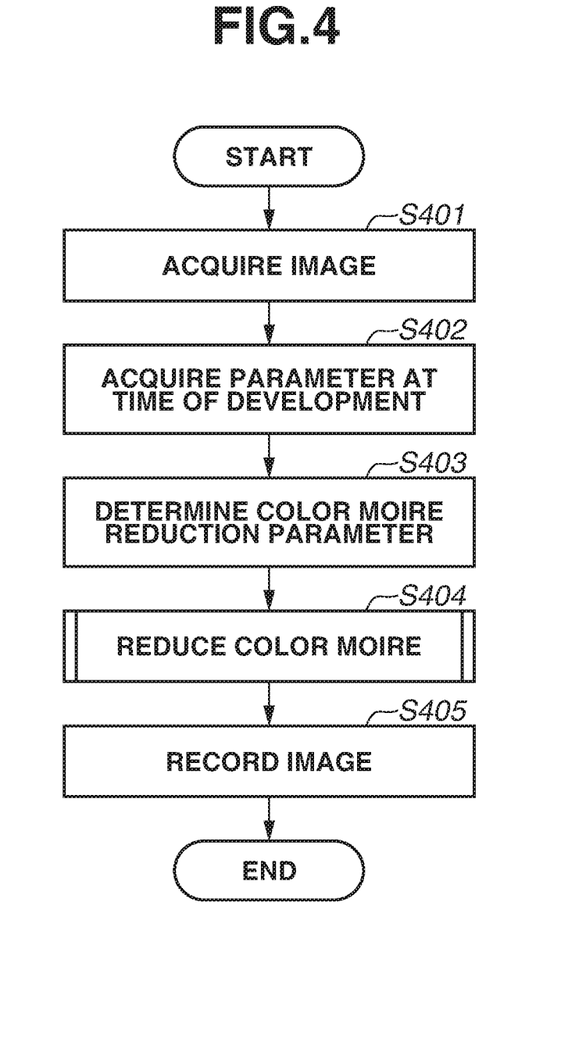
FIG. 4 is a flowchart illustrating one example of image processing according to the first exemplary embodiment.

First, in step S401, the CPU 103 acquires an image to be processed. This acquisition of the image may be, for example, acquisition of the image based on the image signal generated by the image sensor 102A or acquisition of the image recorded in the storage medium 106. Next, in step S402, the CPU 103 acquires the development parameter. For example, the various kinds of setting information stored in the secondary memory 105 can be acquired as the development parameter. Alternatively, the development parameter may be acquired from the image acquired in step S401. Next, in step S403, the CPU 103 determines a color moire reduction parameter. In a subsequent step, step S404, the CPU 103 actually reduces the color moire.

Now, before a start of a description about the color moire reduction processing in step S404, first, color moire reduction processing serving as a base therefor ("A CONVEX REGULARIZER FOR REDUCING COLOR ARTIFACT IN COLOR IMAGE RECOVERY" presented by Shunsuke Ono and Isao Yamada in Conference on Computer Vision and Pattern Recognition (CVPR), pages 1775-1781 in 2013) will be described with reference to FIGS. 5 and 6.

Figure 5:
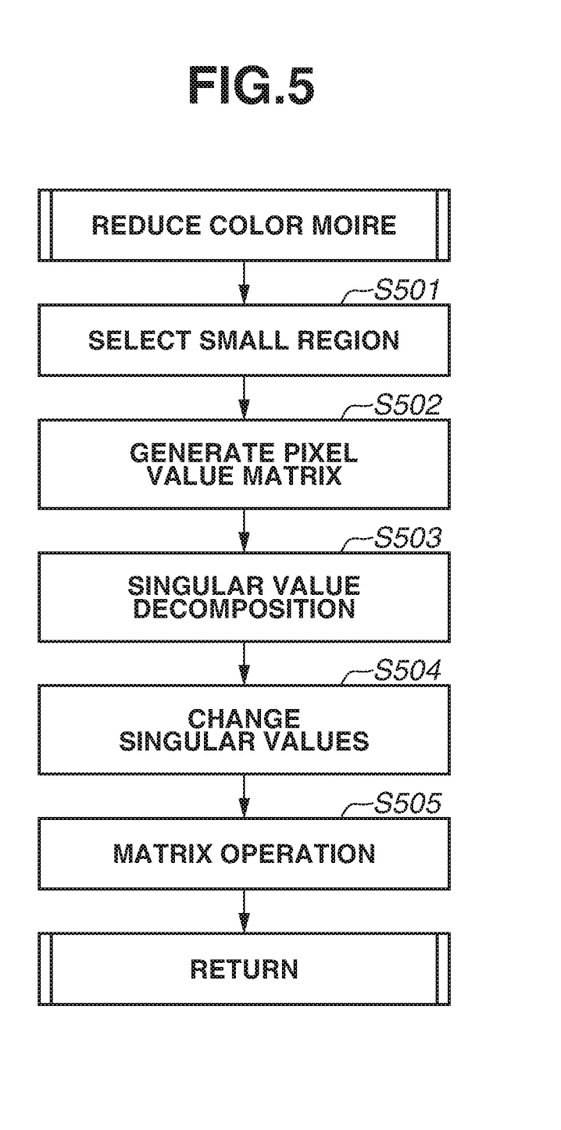
FIG. 5 is a flowchart illustrating one example of color moire reduction processing according to the first exemplary embodiment.

First, referring to FIG. 5, in step S501, the CPU 103 selects a partial region from the image to be processed. In an example illustrated in FIG. 6, a small region 602 is selected from an image to be processed 601. In step S502, the CPU 103 generates a matrix with use of pixel values in the selected small region 602. In the example illustrated in FIG. 6, a matrix X 603 formed by 100 rows and 3 columns can be generated by acquiring R G, and B values of each pixel from the small region 602 including 10 pixels×10 pixels, and arraying the pixel value of each pixel in each row and each of R, G, and B in each column. In a subsequent step, step S503, the CPU 103 performs singular value decomposition processing on the pixel value matrix. The singular value decomposition processing refers to processing that decomposes an arbitrary m×n matrix A into a determinant expressed as A=U×S×V. In this determinant, U is an orthogonal matrix of m×m and V is an orthogonal matrix of n×n. Further, S is a matrix in which an off-diagonal element in m×n is zero, and a diagonal element has a non-negative value and is arranged in descending order. A value that is the diagonal element and is not zero in the matrix S at this time is called a singular value.

Figure 6:
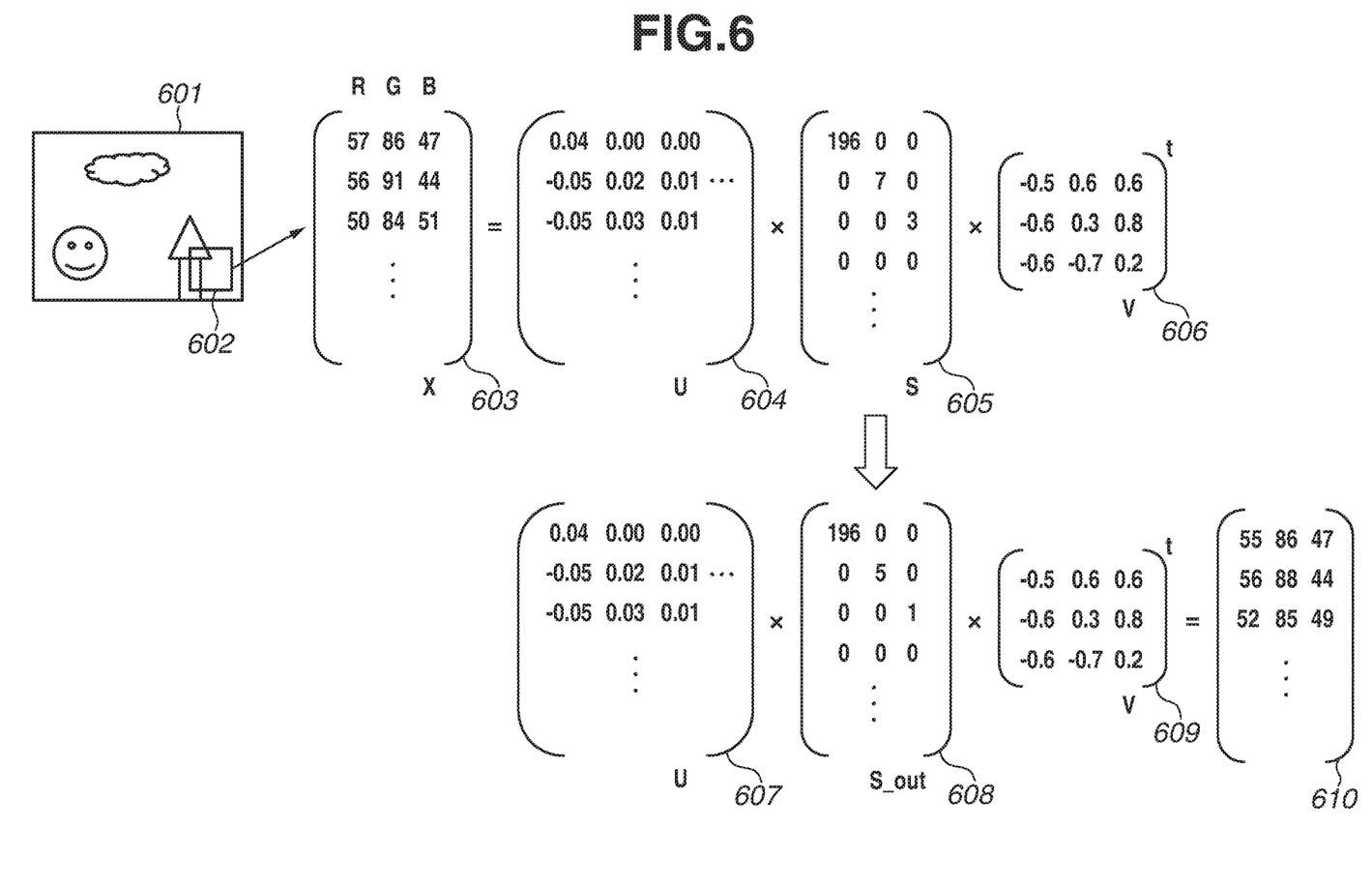
FIG. 6 illustrates the moire reduction processing using singular value decomposition according to the first exemplary embodiment.

In the present exemplary embodiment, the singular value decomposition processing is expressed as X=U×S×V$^t$, where X denotes the matrix X 603, U denotes a matrix U 604, S denotes a matrix S 605, and V denotes a matrix V 606 illustrated in FIG. 6. The matrix X 603 is a matrix formed by 100 rows and 3 columns, the matrix U 604 is an orthogonal matrix formed by 100 rows and 100 columns, the matrix S 605 is a diagonal matrix formed by 100 rows and 3 columns having three singular values as the diagonal elements (all of elements other than the singular values are zero), and the matrix 606 V is an orthogonal matrix formed by 3 rows and 3 columns (a matrix V$^t$ is a transposed matrix of V). Now, regarding the three singular values appearing in the matrix S 605, a maximum value (a first singular value) is supposed to indicate a linear characteristic of the small region 602, and singular values having smaller numerical values (second and third singular values) are supposed to indicate a non-linear characteristic such as a noise component and a color moire component.

Therefore, in step S504, the CPU 103 improves the linearity of the small region 602 by reducing contribution rates of these singular values having relatively small numerical values. For example, the CPU 103 generates a matrix S$_{out}$ 608 acquired by subtracting a predetermined value from each of the numerical values of the second and third singular values from the matrix S 605. After that, in step S505, the CPU 103 can acquire a matrix 610 including pixel values having improved linearity by multiplying the matrix S$_{out}$ 608 by the matrix U (604=607) and the matrix V (606=609). Such pixel values having the improved linearity achieve an image with the color moire component reduced therein.

In the above-described processing, for example, using an equation (1), assuming that $w_1$, $w_2$, and $w_3$ represent respective reduction amounts for three singular values $\sigma_1$, $\sigma_2$, and $\sigma_3$ in the matrix S, allows the linearity to be improved and the color moire to be reduced.

$$\sigma_{i\_out}=\text{MAX}(\sigma_i-w_i,0) \ (i=1,2, \text{ and } 3) \quad \text{Equation (1)}$$

(In this equation, MAX(a, b) indicates a selection of one of a and b that has a larger numerical value). Performing the processing in this manner allows the color moire to be reduced from the image.

However, such processing for correcting the singular value may result in the insufficiency of the correction of the color moire depending on the development parameter as described above. For example, an influence on the color moire in a case where the development parameter is subjected to a change like the adjustment made in the masking processing by the masking processing circuit 211 illustrated in FIG. 2 will be described now. Such a development parameter includes, for example, a parameter for enhancing the color saturation in the image. This parameter may be used for the purpose of, for example, finishing a natural scenery vividly. However, if the development is carried out while this parameter is increased, the color moire undesirably ends up being also emphasized. At this time, the color moire ends up being emphasized while the linear characteristic of the image, like the characteristic appearing in the above-described first singular value, is maintained without being largely changed. Therefore, the values of $\sigma_2$ and $\sigma_3$ corresponding to the second and third highest contribution rates, respectively, among the above-described singular values, tend to increase. When $\sigma_{2s}$ and $\sigma_{3s}$ represent the diagonal elements in the matrix S at this time, the diagonal elements in the matrix S are expressed as, for example, the following equation, assuming that $n_2$ and $n_3$ each represent a coefficient indicating a rate of the increase from the singular value acquired in the case where the color saturation is not enhanced.

$$\sigma_{is}=\sigma_i \times n_i \ (i=2 \text{ and } 3), (n_i>1) \quad \text{Equation (2)}$$

If the reduction rates $w_1$ to $w_3$ similar to the above-described equation (1) are set in such a case, the equation used in the color more reduction processing is expressed by an equation (3).

$$\sigma_{is\_out}=\sigma_{is}-w_i=(\sigma_i \times n_i)-w_i=\sigma_i-w_i+(n_i-1)\sigma_i=\sigma_{i\_out}+(n_i-1)\sigma_i \ (i=2 \text{ and } 3) \quad \text{Equation (3)}$$

Therefore, a resultant value is unintentionally calculated as a larger value than the originally intended $\sigma_{i\_out}$ by an amount corresponding to $(n_i-1)\sigma_i$. Therefore, in the present exemplary embodiment, in step S403, the CPU 103 reduces the color moire by modifying (changing) the color moire reduction parameter according to the development parameter.

For example, an equation (4) is prepared with respect to the equation (2).

$$\sigma_{i\_out}=\text{MAX}(\sigma_i+n_i-w_i,0) \quad \text{Equation (4)}$$

In the equation (4), a value of the coefficient $n_i$ is determined according to a change amount in the case where the color saturation is changed, which allows the strength of the color moire reduction processing to be closer to the strength of the color moire reduction processing when the color saturation is not enhanced. The coefficient $n_i$ at this time may be acquired in advance from, for example, an actual measurement. Further, for example, with the value of the coefficient $n_i$ tabled in advance according to each value of the parameter at the time of the development, the coefficient $n_i$ can be selected according to the employed value of the development parameter. Further, in a case where there is a plurality of development parameters, the coefficient $n_i$ can be determined according to a combination thereof. The CPU 103 records, into the storage medium 106 or the like, the generated image on which the color moire reduction has been performed in this manner, and ends the processing.

According to the present exemplary embodiment, modifying the color moire reduction parameter according to the value of the development parameter for use in the development processing allows the image processing apparatus 100 to perform the color moire reduction processing suitable even in the case where the development parameter is changed.

In the following description, a second exemplary embodiment will be described. In the above-described first exemplary embodiment, the method that applies the uniform reduction amounts to the singular values $\sigma_1$ to $\sigma_3$ has been described as the color moire reduction method. On the other hand, in the present exemplary embodiment, another example of how the image processing apparatus changes the color moire reduction parameter will be described.

Regions of an image acquired by imaging a certain object can be classified into, for example, a region where the color moire has not occurred (referred to as a "solid portion"), a region where the color moire has occurred (referred to as "a false color portion)", and a region containing an edge therein (referred to as an "edge portion"). Tendencies of the singular values in each of the regions at this time will be described with reference to FIGS. 7A to 7D.

Figure 7A:
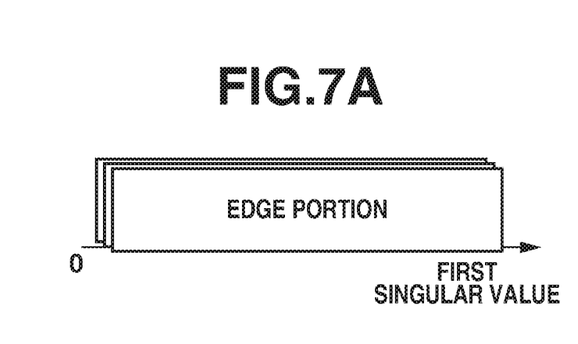
FIG. 7A illustrates an example of a tendency of a first singular value according to second and third exemplary embodiments.

First, the first singular value exhibits a tendency of having approximately similar values in all the solid portion, the false color portion, and the edge portion as illustrated in FIG. 7A, because the linear characteristic of the image does not largely change if objects are similar. On the other hand, the second and third singular values each exhibit a tendency like an example illustrated in FIG. 7B, because the second and third singular values tend to have a relatively lower value in the solid portion than in the other portions and a higher value in the edge portion than in the false color portion. Therefore, in view of this tendency, the color moire reduction processing can also be performed by determining a threshold value X and a threshold value Y like examples illustrated in FIG. 7B, and, if the second or third singular value is determined to belong to a predetermined range identified by the threshold values X and Y, this value can be determined to be removed as the color moire. For example, the following equation allows this processing to be realized.

Figure 7B:
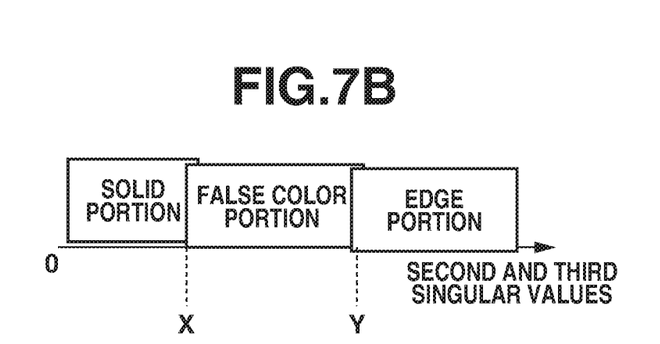
FIG. 7B illustrates an example of a tendency of second and third singular values.

$\sigma_{i\_out} = \sigma_i$ (if $\sigma_i <= X$)

$X$ (if $X < \sigma_i < Y$)

$\sigma_i$ (if $Y <= \sigma_i$) ($i=2$ and 3)  Equation (5)

In the present exemplary embodiment, if the second or third singular value is determined to have a numerical value belonging to the predetermined range estimated as the false color portion, this value is changed into a specific value. This specific value may be, for example, a value out of the predetermined range on a smaller value side or may be, for example, a minimum value in the predetermined range, but the method for determining the specific value is not limited thereto. In the case of the equation (5), the specific value is determined by reducing the singular value to a value corresponding to the solid portion, or the singular value is maintained without being changed if the second or third singular value is determined not to have a numerical value belonging to the predetermined range estimated as the false color portion. In a case where the color moire reduction processing described in the first exemplary embodiment is performed in such a case, this processing can be realized by shifting the threshold value X and the threshold value Y according to each value of the development parameter to change the predetermined range. Because the values of the second and third singular values each tend to increase due to the application of the development processing similarly to the first exemplary embodiment, this operation is intended to shift the threshold values X and Y according to this increase rate. The color moire reduction parameter can be controlled according to the development parameter by, for example, fulfilling the following equation, an equation (6).

$X = X \times n'_i, Y = Y \times n'_i$  Equation (6)

The coefficient $n'_i$ at this time can also be acquired from, for example, an actual measurement. Further, with the value of the coefficient $n'_i$ tabled in advance similarly to the first exemplary embodiment, the coefficient $n'_i$ can be selected according to the employed value of the development parameter. Further, in the case where there is a plurality of development parameters, the value of the coefficient $n'_i$ can be determined according to a combination thereof.

According to the present exemplary embodiment, modifying the color moire reduction parameter according to the value of the development parameter for use in the development processing also allows the image processing apparatus to perform the color moire reduction processing suitable even in the case where the development parameter is changed. Especially, modifying the threshold values for identifying the singular value to be corrected according to the value of the development parameter allows the image processing apparatus to accurately select the false color portion and correct the singular value.

In the following description, a third exemplary embodiment will be described. In the above-described exemplary embodiments, the method that changes the color moire reduction parameter according to the parameter of the color saturation enhancement at the time of the development has been presented. However, the disclosure is not limited thereto, and examples of a case where the disclosure is applicable include a case where the development is carried out while the color saturation is reduced, and, besides that, a case where the noise removal processing (the noise reduction) is performed relatively strongly or weakly, and a case where the gain of the white balance is high or low.

First, in the case where the development is carried out while the color saturation is reduced, replacing $n_i$ with $n_i < 1$ in each of the equations according to the first exemplary embodiment allows the disclosure to be implemented. In this case, $(n_i - 1)\sigma_i$ in the equation (3) has a negative value and therefore unintentionally has a further smaller value than the originally intended $\sigma_{i\_out}$, which means an undesirable overcorrection. Therefore, in the present exemplary embodiment, the calculation is set so as to divide $\sigma_i$ by $n_i$ unlike the equation (2).

$\sigma_{i\_out} = MAX(\sigma_i \div n_i - w_i, 0)$ ($n_i < 1$)  Equation (7)

In other words, according to the present exemplary embodiment, insufficiency of the strength of the reduction processing on the emphasized color moire can be prevented in the case where the development is carried out while the color saturation is increased, and also, overcorrection of the weakened color moire and a normal region can be prevented in the case where the development is carried out while the color saturation is reduced.

Figure 7C:
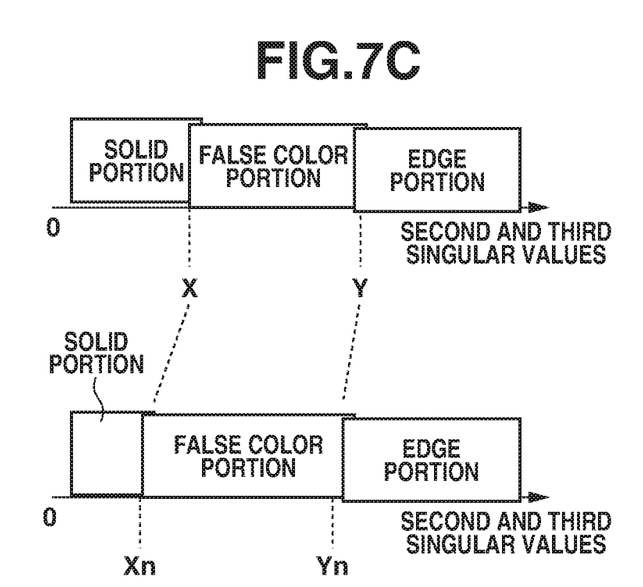
FIG. 7C illustrates an example of a tendency of the second and third singular values in a case where noise reduction is relatively strongly applied.

Next, in the case where the noise reduction is relatively strongly applied, the relationship illustrated in FIG. 7B described in the second exemplary embodiment tends to be shifted as illustrated in FIG. 7C if the noise reduction is carried out so as to make the edge remain with use of, for example, an ε filter. In other words, the value of the singular value is reduced regarding the solid portion and a false color portion close to the solid portion due to the noise reduction, but the value is not largely changed regarding the edge portion and a false color portion close to the edge portion. Therefore, in a case where the correction is made only to the singular value located within the range from X to Y similarly to the correction in normal times, this correction undesirably results in a failure to delete the false color portion located in a range from $X_n$ to X. Therefore, for example, in the case where the noise reduction is strongly applied, changing the threshold values X and Y as expressed by an equation (8) allows the correction to be made to a degree equivalent to the correction in normal times.

$X_n = X \times n_x, Y_n = Y \times n_y$ ($n_y < n_x < 1$)  Equation (8)

Figure 7D:
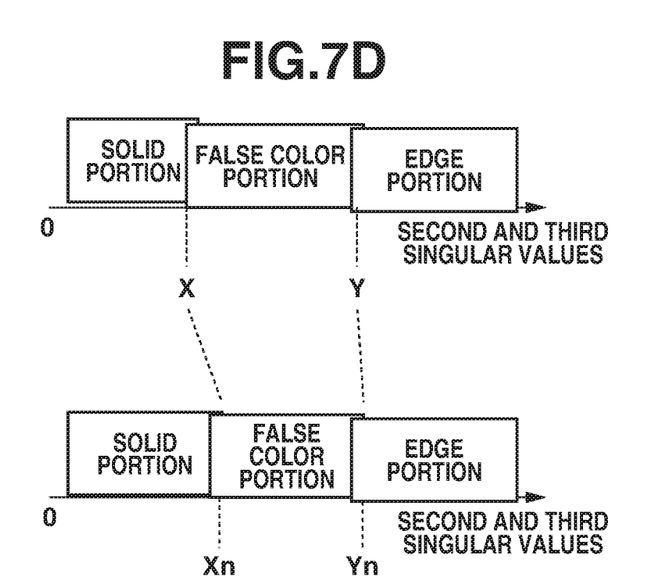
FIG. 7D illustrates an example of a tendency of the second and third singular values in a case where the noise reduction is relatively weakly applied.

On the other hand, in the case where the noise reduction is weak, the relationship illustrated in FIG. 7B is shifted into a relationship with a tendency like an example illustrated in FIG. 7D, which undesirably results in unnecessary deletion of the solid portion located in a range of $X=X_n$. Therefore, this case can be handled by replacing $n_x$ and $n_y$ with larger numerical values than 1 (($1<n_y<n_x$)) similarly to the replacement at the time of the color saturation. At this time, $X_n$ is largely shifted, and $Y_n$ is slightly shifted.

Further, in the case of the white balance, the gain may be different for each color component, and, for example, the gain to be applied to R may be high and/or the gain to be applied to B may be high depending on the light source. To deal with this difference, the color moire emphasized due to the white balance gain can be corrected by employing the equation (4) similarly to the correction at the time of the color saturation enhancement according to, for example, a value of one of R and B that corresponds to a higher white balance gain. Further, for example, in such a case that the white balance gain for R is high and the white balance gain for B is low, the following method allows the image processing apparatus to achieve even the color moire reduction suitable to each of them. Coefficients $n_R$ and $n_B$ according to the respective gains are set to the equation (4). Then, first, only R is adopted from a result of calculation based on the singular values calculated with the reduction rates according to an equation (9).

$$\sigma_{i\_out} = \text{MAX}(\sigma_i \div n_R - w_i, 0) \quad \text{Equation (9)}$$

Then, only G and B are adopted from a result of calculation based on the singular values calculated with the reduction rates according to an equation (10).

$$\sigma_{i\_out} = \text{MAX}(\sigma_i \div n_B - w_i, 0) \quad \text{Equation (10)}$$

In this manner, the present exemplary embodiment allows the image processing apparatus to calculate the suitable parameter of the color moire reduction according to the development parameter of the color saturation enhancement, the noise reduction, the white balance gain, and the like.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-030246, filed Feb. 21, 2017, which is hereby incorporated by reference herein in its entirety.

What is claimed is:

1. An image processing apparatus comprising:
   a processor; and
   a memory storing instructions that, when executed by the processor, cause the processor to perform operations comprising:
   performing development processing on an image,
   acquiring a singular value by carrying out singular value decomposition with respect to a pixel value contained in a partial region in the image on which the development processing has been performed,
   correcting the singular value according to a value of a parameter in the development processing, and
   calculating a corrected pixel value in the partial region with use of the corrected singular value,
   wherein the singular value decomposition is a processing of decomposing a first matrix into a second matrix, a third matrix, and a fourth matrix,
   the second matrix is an orthogonal matrix,
   the third matrix is a matrix in which an off-diagonal element is zero and a diagonal element has a non-negative value, and
   the fourth matrix is an orthogonal matrix.

2. The image processing apparatus according to claim 1, wherein a value of a singular value other than a first singular value having a maximum value among singular values is corrected.

3. The image processing apparatus according to claim 1, wherein the singular value is corrected by subtracting a predetermined value after modifying the singular value with use of a coefficient set according to the value of the parameter.

4. The image processing apparatus according to claim 2, wherein the instructions, when executed by the processor, further cause the processor to:
   determine whether the value of the other singular value belongs to a predetermined range,
   wherein the other singular value is corrected into a specific value if the value of the other singular value is determined to belong to the predetermined range.

5. The image processing apparatus according to claim 4, wherein the predetermined range is changed according to the value of the parameter.

6. The image processing apparatus according to claim 5, wherein a small value is changed more largely than a large value, among values defining the predetermined range.

7. The image processing apparatus according to claim 2, wherein the other singular value for each of color components is corrected according to the value of the parameter for each of the color components in the image in the development processing, and the corrected pixel value of each of the color components in the partial region is calculated with use of the corrected singular value of the corresponding color component.

8. The image processing apparatus according to claim 1, wherein the development processing includes at least any of white balance processing, color interpolation processing, noise removal processing, and masking processing.

9. The image processing apparatus according to claim 1, further comprising an image sensor configured to capture the image.

10. An image processing method comprising:
performing development processing on an image;
acquiring a singular value by carrying out singular value decomposition with respect to a pixel value contained in a partial region in the image on which the development processing has been performed;
correcting the singular value according to a value of a parameter in the development processing; and
calculating a corrected pixel value in the partial region with use of the corrected singular value,
wherein the singular value decomposition is a processing of decomposing a first matrix into a second matrix, a third matrix, and a fourth matrix,
the second matrix is an orthogonal matrix,
the third matrix is a matrix in which an off-diagonal element is zero and a diagonal element has a non-negative value, and
the fourth matrix is an orthogonal matrix.

11. A non-transitory computer readable storage medium recording a computer program for causing a computer to perform operations comprising:
performing development processing on an image;
acquiring a singular value by carrying out singular value decomposition with respect to a pixel value contained in a partial region in the image on which the development processing has been performed;
correcting the singular value according to a value of a parameter in the development processing; and
calculating a corrected pixel value in the partial region with use of the corrected singular value,
wherein the singular value decomposition is a processing of decomposing a first matrix into a second matrix, a third matrix, and a fourth matrix,
the second matrix is an orthogonal matrix,
the third matrix is a matrix in which an off-diagonal element is zero and a diagonal element has a non-negative value, and
the fourth matrix is an orthogonal matrix.

12. The image processing apparatus according to claim 1, wherein the first matrix is an arbitrary m×n matrix,
the second matrix is a m×m matrix,
the third matrix is a m×n matrix, and
the fourth matrix is a n×n matrix.

* * * * *